Figure 6:
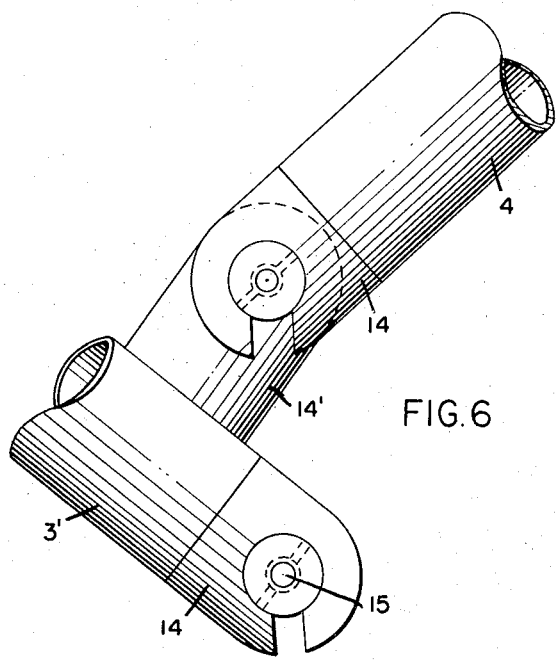

United States Patent

[11] 3,628,806

[72] Inventors: Walter Weber, 25/11 Clemensstrasse, Munich; Herbert Templin, Heiligendorf near Wolfsburg, both of Germany
[21] Appl. No.: 871,338
[22] Filed: Oct. 29, 1969
[45] Patented: Dec. 21, 1971
[32] Priority: May 26, 1966
[33] Germany
[31] W 41670

Original application May 19, 1967, Ser. No. 639,894, now Patent No. 3,503,624, dated Mar. 31, 1970. Divided and this application Oct. 29, 1969, Ser. No. 871,338

[54] SULKY
8 Claims, 7 Drawing Figs.
[52] U.S. Cl. ................................................ 280/63
[51] Int. Cl. ........................................... B62d 27/04
[50] Field of Search .............................. 280/63, 64

[56] References Cited
UNITED STATES PATENTS
244,404  7/1881  Stillman ................. 280/63
507,839  10/1893  Payne .................... 280/63

Primary Examiner—Benjamin Hersh
Assistant Examiner—Robert R. Song
Attorney—Cushman, Darby & Cushman ABSTRACT: A sulky normally does not provide for variations in weight between different riders, and this is achieved in the invention by using struts between the frame and the axles which are pivotably adjustable so as to vary the angle between them.

A modification of the invention provides for a single strut between the frame and each axle, the said strut being pivotable and held in position by bracing members.

Shock-absorbing means are also provided.

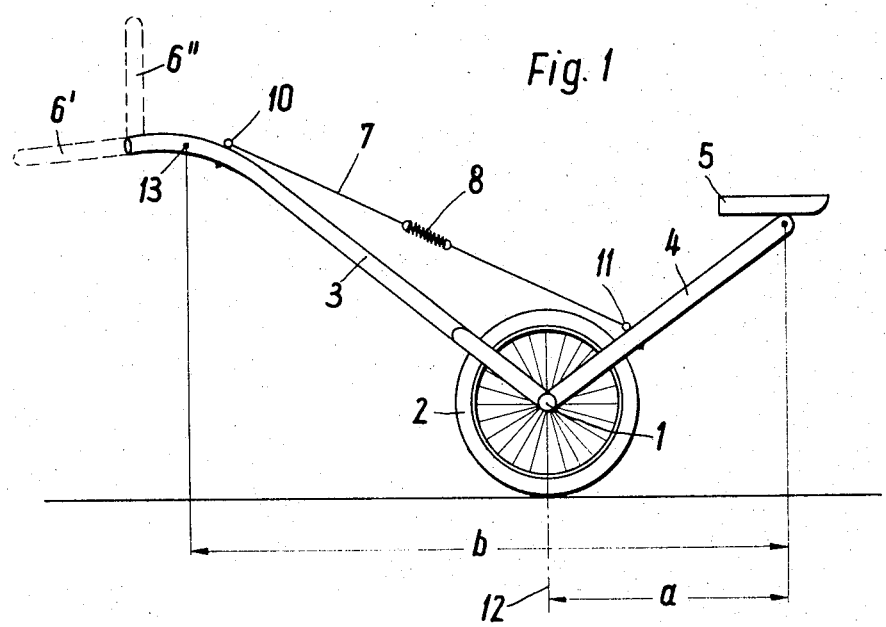
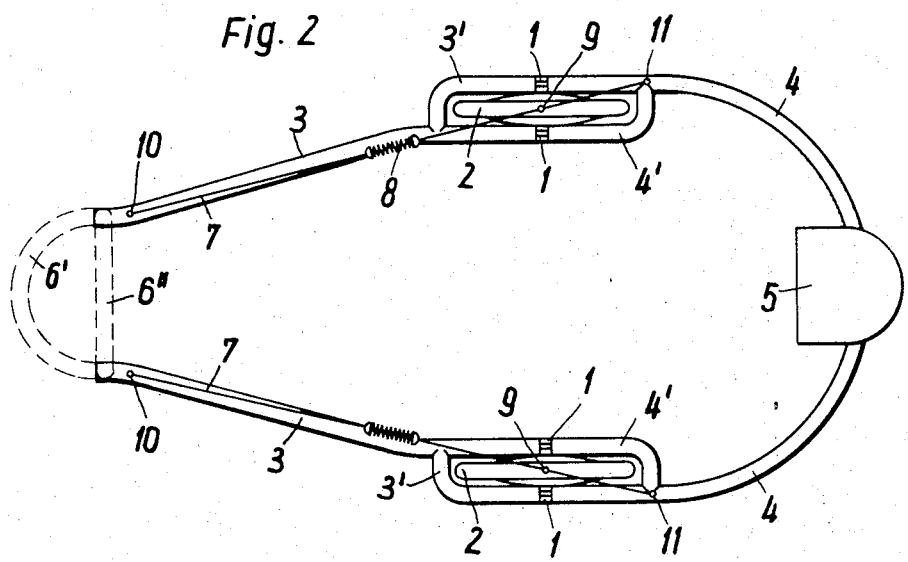

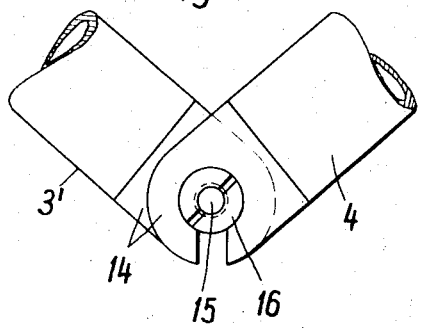
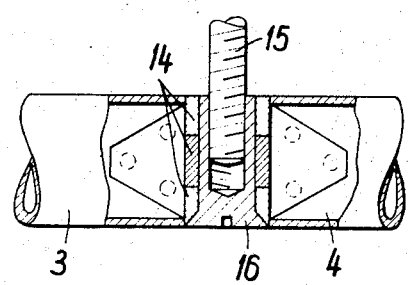
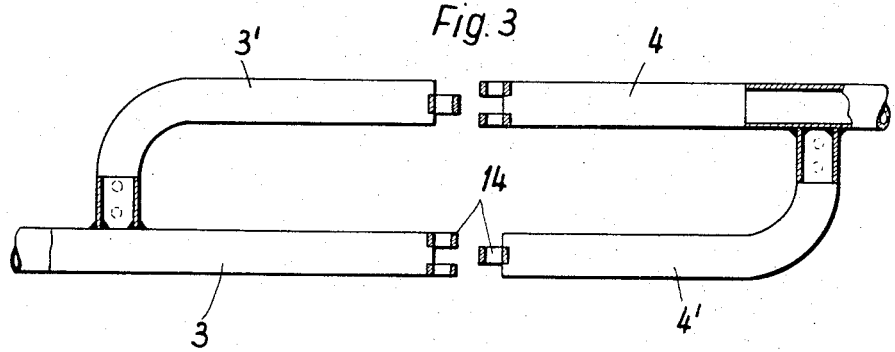

PATENTED DEC21 1971 3,628,806

SHEET 3 OF 3

INVENTORS
WALTER WEBER
HERBERT TEMPLIN

SULKY

This is a division of our earlier copending application Ser. No. 639,894 filed May 19, 1967, now U.S. Pat. No. 3,503,624 issued Mar. 31, 1970.

This invention relates to a sulky of the type in which the driver's seat is located to the rear of the vertical plane through the wheel axles, and the wheel axle bearings are connected to the drawing shafts by at least one pair of struts.

In such sulkies the horse's hindquarters are located in the proximity of the vertical plane through the wheel axles, the object of the arrangement being to relieve the horse's back of the weights of the carriage and driver, and there should be a tendency for the horse to be lifted so that it can trot as easily and smoothly as possible. In practice the weight is not in fact relieved to the desired extent by the counterweight of the driver. Adjustment of the position of the driver's seat which some types of sulky permit, is not sufficient for a fine adjustment to be effected of the distance between the point of attachment of the shafts to the harness of the horse and the driver's seat, and between the driver's seat and the vertical plane through the wheel axles, as is necessary for relieving weight from the horse. Another disadvantage of conventional sulkies is that jolts affecting the carriage are transmitted through the traces to the horse's breast strap and thus trouble and hinder it, inducing the horse to gallop.

When not in use sulkies occupy a good deal of space, which is a nuisance particularly from the point of view of convenient transportation from one race course to another.

It is the object of the present invention to avoid such disadvantages, and sulkies constructed according to the invention enable the weight on the horse to be relieved as required, taking into account the weight of any particular driver occupying the seat of the sulky, and which can be run with the maximum comfort to the horse. Moreover, sulkies according to the invention are capable of being easily dismantled and reassembled.

The invention consists of a sulky having a frame consisting of drawing shafts and a rearwardly arched member carrying a driver's seat situated to the rear of a vertical plane through the wheel axles, each of which wheel axles is connected to the frame by at least two struts inclined at an angle to each other, the improvement being that the said struts are pivotally connected so that the angle between them is adjustable.

In one embodiment both of two struts are mounted on the particular axle by a lug at the axle end of each strut, and in another embodiment only one strut engages the particular axle, a second strut being pivotably mounted on the said first strut.

One of the struts mounted on a particular axle may form the conventional integral rearward arched member which carries the driver's seat, the other of the said struts forming one of the drawing struts. The struts may each be held in the desired position relative to each other by an adjustable bracing member which may be resilient. Alternatively at least one of the struts may be an adjustable telescopic strut.

In a modification of the arrangement according to the invention hereinbefore described, each of only one pair of struts engages the particular axles of the wheels, each strut of the said one pair being held in its desired position by a pair of oppositely placed bracing members, e.g. wires which may be resilient.

The arrangement according to the invention readily permits the distances between the point of attachment of the shafts to the harness and the driver's seat, and between the driver's seat and the vertical plane through the wheel axles, to be adjusted. Such adjustment may be facilitated by forming the shafts and/or a rearward arched member from the struts so as to be adjustable in length, for instance by the use of telescopic struts. The bracing members impart resilience to the carriage frame and thus suppresses the transmission of jolts to the horse.

In the case of a sulky comprising shafts and a rearward arched member of integral construction in a manner known in the art, the struts according to the invention may be pivotably attached to the shafts and they may be of adjustable length, for instance by a telescopic form of construction. By varying the ratio of the respective lengths of the struts the position of the wheel axles in relation to the point of attachment of the shafts to the harness and the position of the driver's seat can be adjusted as may be desired.

It has been found that the horse is relieved of weight in a desirable manner if the horizontal distance between the vertical on the wheel axles and the driver's seat is between one-seventh and five-sevenths of the horizontal distance between the point of attachment of the shafts to the harness and the driver's seat.

Particular and preferred embodiments of the invention are hereinafter described and illustrated in the accompanying drawings, of which FIG. 1 is a side elevation of a sulky according to the invention, and FIG. 2 a plan view thereof, FIGS. 3, 4 and 5 are details of the arrangement for mounting the wheel axles of the sulky, shown partly in section, FIG. 6 is a detail view, similar to FIG. 5, of a modification wherein the drawing shaft strut is mounted on a wheel axle by a lug at the axle end of the drawing shaft strut, and the seat-carrying arched member strut is pivotally mounted on the drawing shaft strut.

Figure 7:
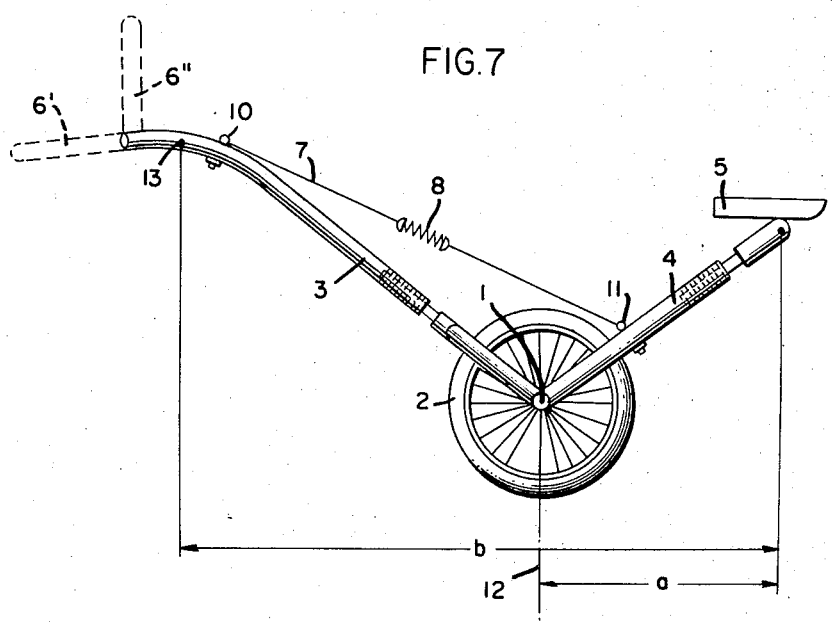

FIG. 7 is a side elevation view of a sulky, similar to that of FIG. 1, wherein the struts are modified to incorporate resilient telescoping joints.

Referring to FIGS. 1 to 5 of the said drawings, bearings 1 of the axles 15 of the wheels 2 and of their bushes 16 are formed by lugs 14 at the ends of the relatively deflectable pair of struts 3,3 and strut 4. The pair of struts 3,3 form the shafts of the sulky and the strut 4 forms a closed rearward arch which carries the driver's seat 5. The seat may be adjustable to a rear position as indicated in chain outline. The front ends of the shafts 3,3, as indicated by chain lines, may be cross-connected by an arch 6' either across the breast of the horse or (6'') over the back of the horse, which arrangements make for stability of construction and ensures that the wheel track cannot vary.

The pair of struts 3,3 and strut 4 are held at the desired angle to each other by resilient bracings for instance in the form of tensioned wires 7,7. Each tension wire includes a spring 8, which imparts resilience to the carriage frame and during the race prevents jolts from being transmitted to the horse's body, such as would otherwise be transmitted through the traces to the horse's breast. For maintaining the correct wheel track it is important that the bracing wires 7,7 each pass through an imaginary point 9 located vertically above the centers of the axles of the wheels 2. By changing the points of attachment 10 and 11 of each tension wire, for instance by relocating clamping straps, the relative angle made by the struts 3 and 4, and hence the horizontal distance $a$ between the vertical 12 and the driver's seat 5, are adjustable. These distances can also be varied by providing struts 3 and 4 of adjustable length, for instance by employing telescopic struts, e.g. incorporating telescopic joints 17 which may be resilient in character (FIG. 7). It has been found particularly useful to adjust the distance $a$ to between one-seventh and five-sevenths of the distance $b$ between the driver's seat and the point of attachment of the harness.

FIG. 3 illustrates a strut 3 separated from the strut 4, and the corresponding axle bearings 1 when separated. The strut 3 is provided with an arcuate lateral member 3' and the strut 4 has a similar member 4' attached thereto, for instance by welding. The ends of the struts 3 and 4 as well as of the members 3' and 4' are formed with lugs 14 through which the axle 15 is insertable and which can be secured on each side by a threaded bush 16 and threads on the axle 15. FIG. 4 shows the screw mounting on one side. It will be understood from FIG. 5 that the slotted lugs at the ends of the struts 3 and 4 together embrace the axle 15.

It will also be appreciated from the said drawings that the sulky can be assembled and dismantled merely by carrying out a few simple manipulations. The components can then be closely packed to occupy little space during transportation and storage.

FIGS. 6 to 9 show a further embodiment comprising shafts 17 integral with a rear arch 18, the frame being made rigid by bracing stays 18'. The driver's seat 5 is mounted on the arch and may be adjustable.

In FIG. 6 a modification is shown wherein the drawing shaft strut 3' is mounted on wheel axle 15 by a lug 14 at the axle end of the drawing shaft strut and the seat-carrying arched member strut 4 is pivotally mounted on the drawing shaft strut.

What is claimed is:

1. A sulky having a frame that includes:
    a pair of transversely aligned wheel axles;
    a pair of drawing shafts, each having a rearwardly directed strut;
    a rearwardly inclined, arched member carrying a driver's seat situated to the rear of a vertical plane through the longitudinal axes of said wheel axles;
    a pair of struts extending forwardly at opposite sides of the arched member as portions thereof;
    the strut of the left one of said drawing shafts and the strut at the left side of said arched member being pivotally mounted on the left one of said pair of transversely aligned wheel axles by lug means;
    the strut of the right one of said drawing shafts and the strut at the right side of said arched member being pivotally mounted on the right one of said pair of transversely aligned wheel axles by lug means;
    the two recited left struts extending at an adjustable angle with respect to one another about said left wheel axle due to the recited pivotal mounting thereof;
    the two recited right struts extending at an adjustable angle with respect to one another about said right wheel axle due to the recited pivotal mounting thereof; and
    means for holding the struts in desired angular relationship respecting one another.

2. A sulky as claimed in claim 1, in which the angle between the said struts mounted on a respective axle, is controlled by an adjustable bracing member extending between the said struts.

3. A sulky as claimed in claim 2, in which the said bracing member is resilient.

4. A sulky as claimed in claim 1, in which the drawing shafts are interconnected by an arched member at their forward ends.

5. A sulky having a frame that includes:
    a pair of transversely aligned wheel axles;
    a pair of drawing shafts, each having a rearwardly directed strut;
    a rearwardly inclined, arched member carrying a driver's seat situated to the rear of a vertical plane through the longitudinal axes of said wheel axles;
    a pair of struts extending forwardly at opposite sides of the arched member as portions thereof;
    the strut of the left one of said drawing shafts and the strut at the left side of said arched member being pivotally mounted on the frame for pivoting about transversely directed horizontal axes;
    the strut of the right one of said drawing shafts and the strut at the right side of said arched member being pivotally mounted on the frame for pivoting about transversely directed horizontal axes;
    the two recited left struts extending at an adjustable angle with respect to one another due to the recited pivotal mounting thereof;
    the two recited right struts extending at an adjustable angle with respect to one another due to the recited pivotal mounting thereof; and
    means for holding the struts in desired angular relationship respecting one another.

6. A sulky as claimed in claim 5, in which at least one of the said struts is a telescopic strut.

7. A sulky as claimed in claim 6, in which the said telescopic strut is a resilient strut.

8. The sulky of claim 5 wherein a corresponding left strut and right strut of said struts are respectively pivotally mounted on the frame via the left and right wheel axles and the other corresponding left and right struts of said struts are pivotally mounted on the respective ones of the first-mentioned corresponding left strut and right strut.

* * * * *